US009376207B2

(12) United States Patent
Becklin et al.

(10) Patent No.: US 9,376,207 B2
(45) Date of Patent: Jun. 28, 2016

(54) FUSELAGE INDEXING SYSTEM AND METHOD

(71) Applicant: Becklin Holdings, Inc., Reno, NV (US)

(72) Inventors: Dennis S. Becklin, Grants Pass, OR (US); Dean A. Weathers, Medford, OR (US); Adrian P. Tayne, Grants Pass, OR (US)

(73) Assignee: Becklin Holdings, Inc., Reno, NV (US)

( * ) Notice: Subject to any disclaimer, the term of this patent is extended or adjusted under 35 U.S.C. 154(b) by 61 days.

(21) Appl. No.: 13/974,350

(22) Filed: Aug. 23, 2013

(65) Prior Publication Data
US 2015/0053819 A1 Feb. 26, 2015

(51) Int. Cl.
*B64C 39/02* (2006.01)

(52) U.S. Cl.
CPC ......... *B64C 39/024* (2013.01); *B64C 2201/021* (2013.01); *B64C 2201/201* (2013.01); *Y10T 29/49815* (2015.01)

(58) Field of Classification Search
CPC ........ B64C 1/26; B64C 31/02; B64C 39/024; B64C 39/028; B64C 3/56; B64C 3/385; A63H 27/00; A63H 27/001; A63H 27/002; A63H 27/02; A63H 27/007; A63H 27/08
See application file for complete search history.

(56) References Cited

U.S. PATENT DOCUMENTS

| | | | | |
|---|---|---|---|---|
| 2,459,009 A | * | 1/1949 | Wallis | 244/36 |
| 3,612,484 A | * | 10/1971 | Gallagher et al. | 414/785 |
| 3,935,664 A | * | 2/1976 | Neuhierl | 446/34 |
| 4,535,958 A | * | 8/1985 | Hutchison | 244/123.8 |
| 5,035,382 A | * | 7/1991 | Lissaman et al. | 244/190 |
| 6,224,451 B1 | * | 5/2001 | Lai | 446/34 |
| 6,425,794 B1 | * | 7/2002 | Levy et al. | 446/34 |
| 7,210,654 B1 | * | 5/2007 | Cox et al. | 244/63 |
| 7,237,750 B2 | * | 7/2007 | Chiu et al. | 244/119 |
| 7,922,115 B2 | * | 4/2011 | Colgren et al. | 244/13 |
| 8,128,032 B2 | * | 3/2012 | Pajard | 244/124 |
| 8,133,089 B2 | * | 3/2012 | Amireh et al. | 446/58 |
| 8,500,067 B2 | * | 8/2013 | Woodworth et al. | 244/120 |
| 8,660,712 B2 | * | 2/2014 | Grabowsky et al. | 701/3 |
| 8,721,383 B2 | * | 5/2014 | Woodworth et al. | 446/6 |
| 8,939,810 B1 | * | 1/2015 | Suknanan | 446/34 |
| 8,991,750 B2 | * | 3/2015 | Woodworth et al. | 244/54 |

FOREIGN PATENT DOCUMENTS

| | | | | |
|---|---|---|---|---|
| CN | 203698950 U | * | 7/2014 | ............. B64D 61/00 |
| FR | 2920745 A1 | * | 3/2009 | ............. B64C 39/02 |

OTHER PUBLICATIONS

Machine Translation of CN 203698950 U.*

* cited by examiner

*Primary Examiner* — Christopher P Ellis
*Assistant Examiner* — Michael Wang
(74) *Attorney, Agent, or Firm* — Lowe Graham Jones PLLC

(57) ABSTRACT

A system is disclosed including at least one indexing stub secured to a fuselage in the place of one or more wing stubs and including indexing members protruding from opposite sides of the fuselage. A pair of receivers are mounted to a container and define channels to receive the indexing members. The channels may include an upper flared portion and a lower straight portion. The indexing members are lowered into the channels and the flared portions guide the indexing members into the straight portions. In some embodiments, a pair of clamping members are configured to selectively lock the indexing members within the channels. The indexing members may have a cylindrical shape and may be rotatably mounted to the at least one indexing stub.

19 Claims, 10 Drawing Sheets

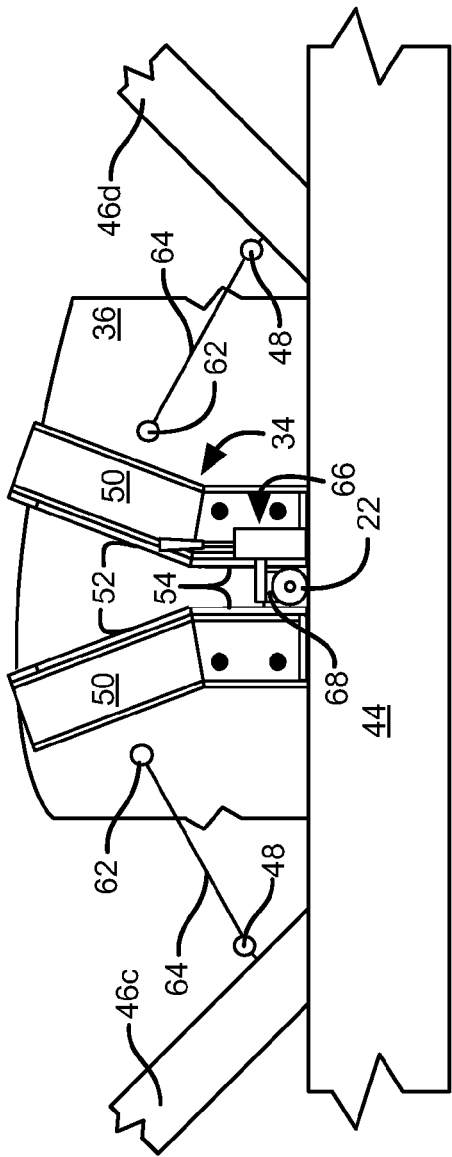
Fig. 7C
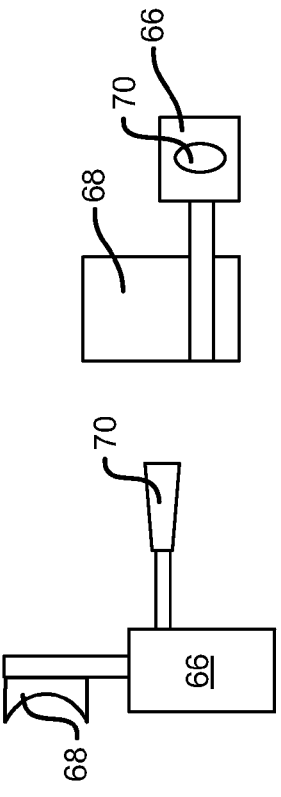
Fig. 8A
Fig. 8B
Fig. 8C

FUSELAGE INDEXING SYSTEM AND METHOD

FIELD OF THE INVENTION

This application relates to systems and methods for storing and shipping an aerial vehicle, such as an unmanned aerial vehicle (UAV).

BACKGROUND OF THE INVENTION

The capabilities and use of UAVs has exploded in recent years. Some UAVs have the capacity of performing long distance surveillance as well as launching missiles. Inasmuch as a UAV has no pilot, it is often inconvenient to fly a UAV to a theatre of operation that exceeds the operational range of the drone. However, UAVs are very sophisticated machines and can also be very large.

Accordingly, it would be an advancement in the art to provide an improved means for shipping and storing a UAV.

SUMMARY OF THE INVENTION

In one aspect of the invention, a system is disclosed for storing an aerial vehicle having a fuselage defining at least one attachment interface for receiving spars of wings secured to the fuselage. The system may include at least one indexing stub defining at least one mating interface configured to secure to the at least one attachment interface. A pair of indexing members are secured to the indexing stub and protrude outside of opposite sides of the fuselage when the at least one mating interface is secured to the at least one attachment interface. A pair of receivers may be mounted to a container and defining channels positioned to receive the indexing members. The channels may include an upper flared portion and a lower straight portion. In some embodiments, a pair of clamping members are configured to selectively lock the indexing members within the channels. The indexing members may have a cylindrical shape (the cylindrical shape may reduce binding in the receiver) and may be rotatably mounted to the at least one indexing stub.

BRIEF DESCRIPTION OF THE DRAWINGS

Preferred and alternative examples of the present invention are described in detail below with reference to the following drawings:

FIGS. 7A-7C illustrate a process for inserting an indexing member into a receiver in accordance with an embodiment of the present invention;

FIGS. 8A-8C illustrate a clamping member suitable for use in accordance with an embodiment of the present invention.

DETAILED DESCRIPTION OF THE PREFERRED EMBODIMENT

Figure 1:
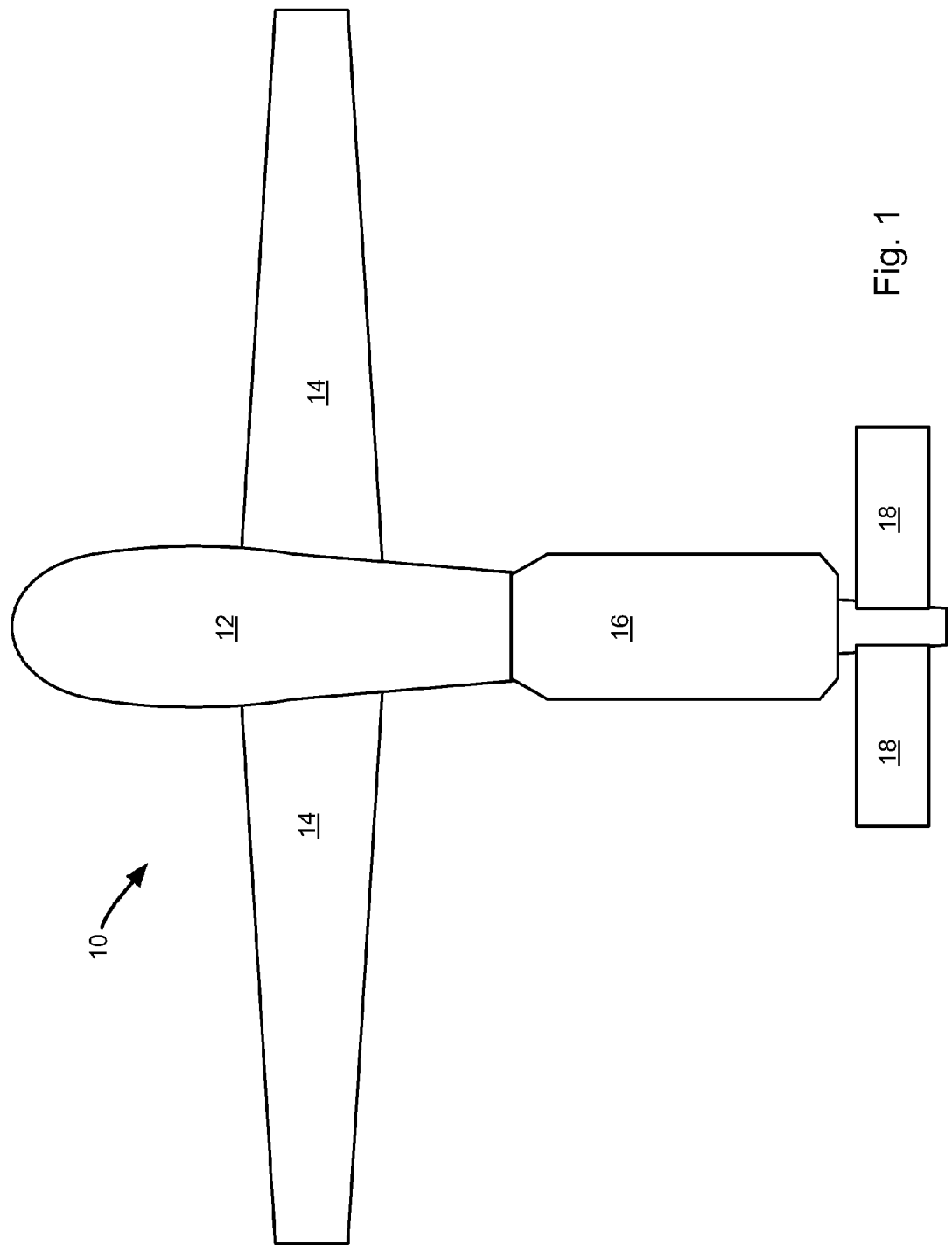
FIG. 1 is a top plan view of a UAV such as might be used in accordance with an embodiment of the present invention.

Referring to FIG. 1, a UAV 10 may be embodied as a fixed-wing aircraft having a fuselage 12. Wings 14 extend laterally from the fuselage 12 and may define an airfoil contour. One or more propulsion sources 16 are mounted to the fuselage 12 or the wings 14. The propulsion source 16 may be embodied as an internal combustion engine coupled to a propeller, turbo fan, or the like. The propulsion source 16 may also be embodied as a jet engine coupled to a propeller or turbo fan or used alone.

One or more tail planes 18 defining an empennage of the UAV 10 may secure to a rearward end of the fuselage 12. The tail planes 18 may define a conventional horizontal stabilizer and vertical stabilizer with corresponding elevator and rudder control surfaces. Alternatively, tail planes 18 may include a pair of angled tail planes each with a corresponding control surface and protruding upwardly or downwardly from the fuselage 12.

Figure 2:
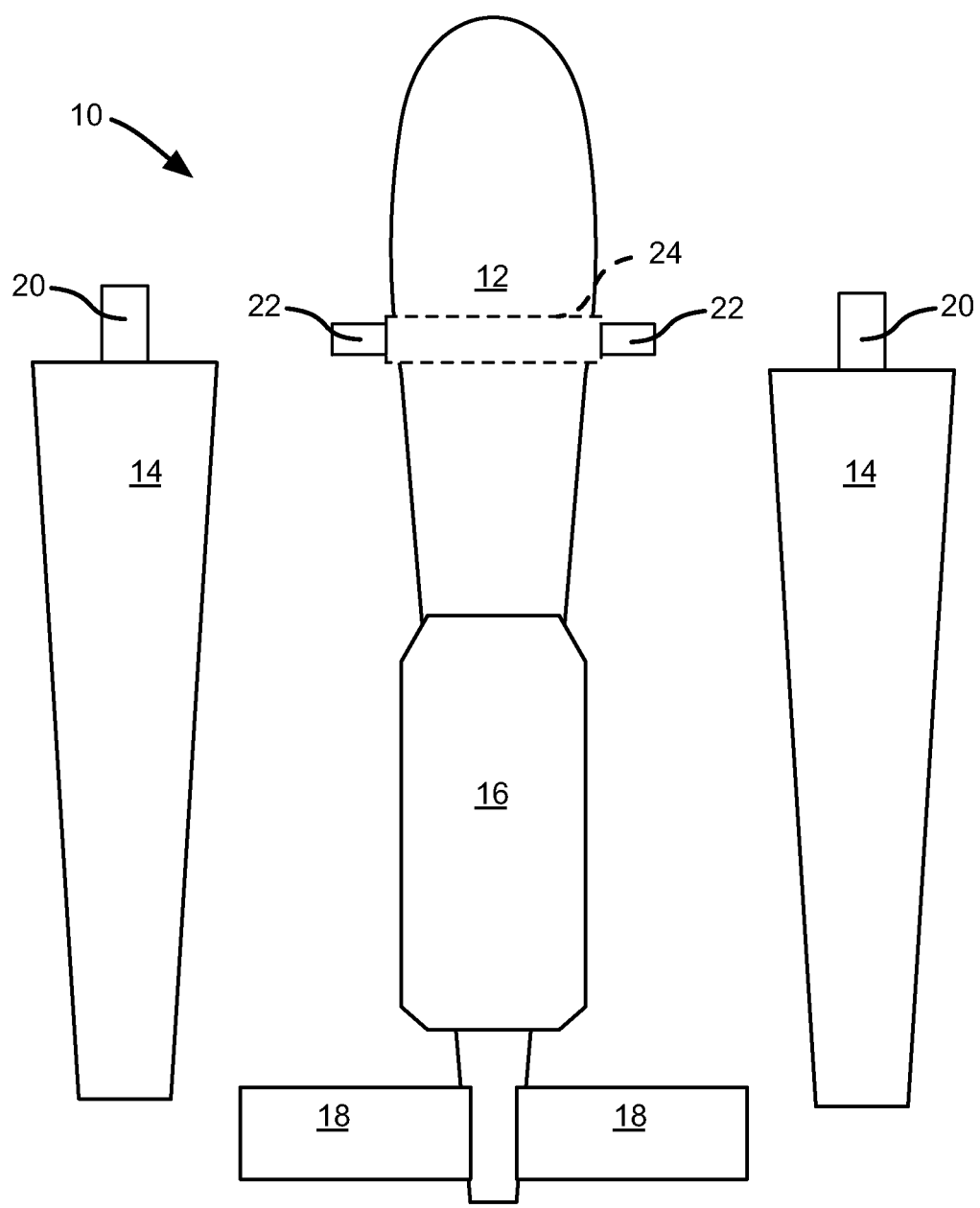
FIG. 2 is top plan view of a disassembled UAV having indexing members secured thereto in accordance with an embodiment of the present invention.

Referring to FIG. 2, to facilitate shipping and storage, the UAV 10 may be disassembled. As shown in FIG. 2 at least the wings 14 may be removed to reduce the footprint of the UAV 10. Other parts of the UAV 10 such as the propulsion source 16 and tail planes 18 may also be removed. The wings 14 may secure to the fuselage by means of wing spars 20. As known in the art, spars 20 of a wing 14 provide structural rigidity to the wing 14 for transferring lift forces to the fuselage 12. In some embodiments, wings 14 may secure by some other means or interface other than wing spars 20, such as a plate or other structure defining a hole pattern for receiving fasteners. Following shipment or storage according to methods disclosed herein, the wings 14 may be reattached to the fuselage 12 using the wing spars 20 in order to deploy the UAV 10.

The fuselage 12 may have indexing members 22 fastened thereto using a fastening system 24. As discussed in greater detail below, the fastening system 24 may have an identical configuration to the wing spars 20, or a portion of the wing spars 20, such that the indexing members 22 secure to the fuselage 12 in the place of the wings 14.

Figure 3A:
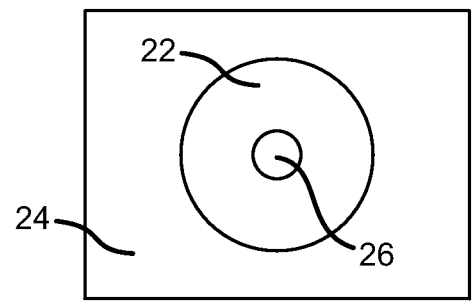
FIGS. 3A and 3B illustrate an indexing member attachment system in accordance with an embodiment of the present invention.
Figure 3B:
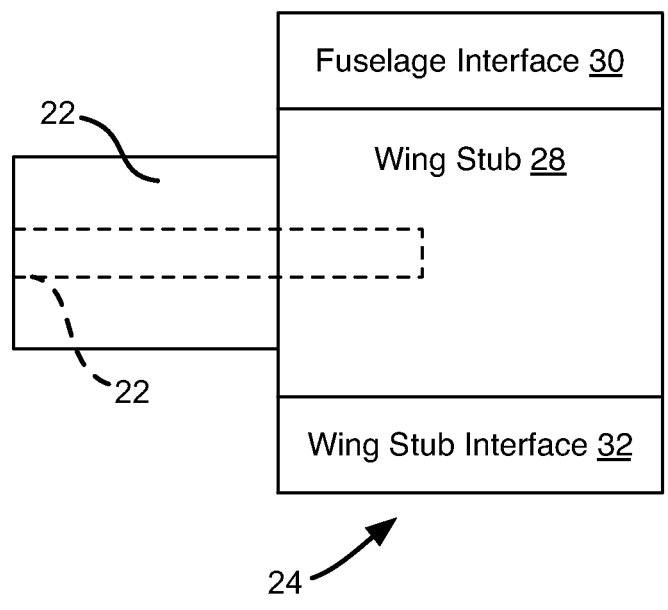

Referring to FIGS. 3A and 3B, the indexing member 22 may have a rounded shape, e.g. cylindrical, elliptical, oval, or the like. In some embodiments, the indexing member 22 is rotatably mounted to the fastening system 24, such as by means of an axle 22. As will be discussed below, the indexing member 22 may undergo sliding contact with other structures. Accordingly, the indexing member 22 may be formed of a low friction material or be partially or completely coated with a low friction material. For example, a low friction material may include Teflon™, a rigid plastic such as an ultra-high molecular weight (UHMW) plastic, an oil impregnated metal such as Oillite™, or the like.

The fastening system 24 may include a wing stub 28 (or indexing stub 28) that may be sized and configured similarly to at least a portion of the wing spar 20. Likewise, the wing stub 28 may define a fuselage interface 30. For example, the wing stub 28 may be an exact replica, within manufacturing tolerances, of the wing spar 20. Alternatively, where the wing stubs 28 define a geometry mating with a portion of the fuselage 12 (e.g. an attachment interface), the wing stub 28 may define at least this same geometry, though other parts of the wing spar 20 are omitted. In some embodiments, forces exerted on an indexing member 22 during shipping and storage may be less than those exerted on a wing 14. Accordingly, the wing stub 28 and/or fuselage interface 30 may only include part of a wing spar 20 and the fuselage interface 30 (e.g. a mating interface) of the wing spar 20 inasmuch as less structural strength is needed. For example, where a wing spar 20 has a length X, a wing stub 28 may have a length Y that is less than X where less strength is needed. Likewise, where a wing spar 20 defines an interface with N attachment points, the fuselage interface 30 may define M (M<N) attachment points that have the same geometry and configuration of less than all of the N attachment points.

The wing stub 28 and fuselage interface 30 may include all or part of any wing spar 20 and corresponding attachment structures known in the art. For example, where the wing spar 20 defines a hole pattern for receiving fasteners securing the wing spar 20 to the fuselage 12, the wing stub 28 may include an identical hole pattern or a portion of the hole pattern, within manufacturing tolerances.

In some embodiments, wing spar 20 may secure to another wing spar 20 when mounted to the fuselage 12. Accordingly, a wing stub 28 may define a wing stub interface 32 configured to secure to the wing stub interface 32 of another wing stub 28 positioned on an opposing side of the fuselage 12. Inasmuch as the wing stub 28 is designed to secure to another wing stub 28, the wing stub interface 32 may be identical to or different from a wing stub interface of a wing spar 20.

Figure 4A:
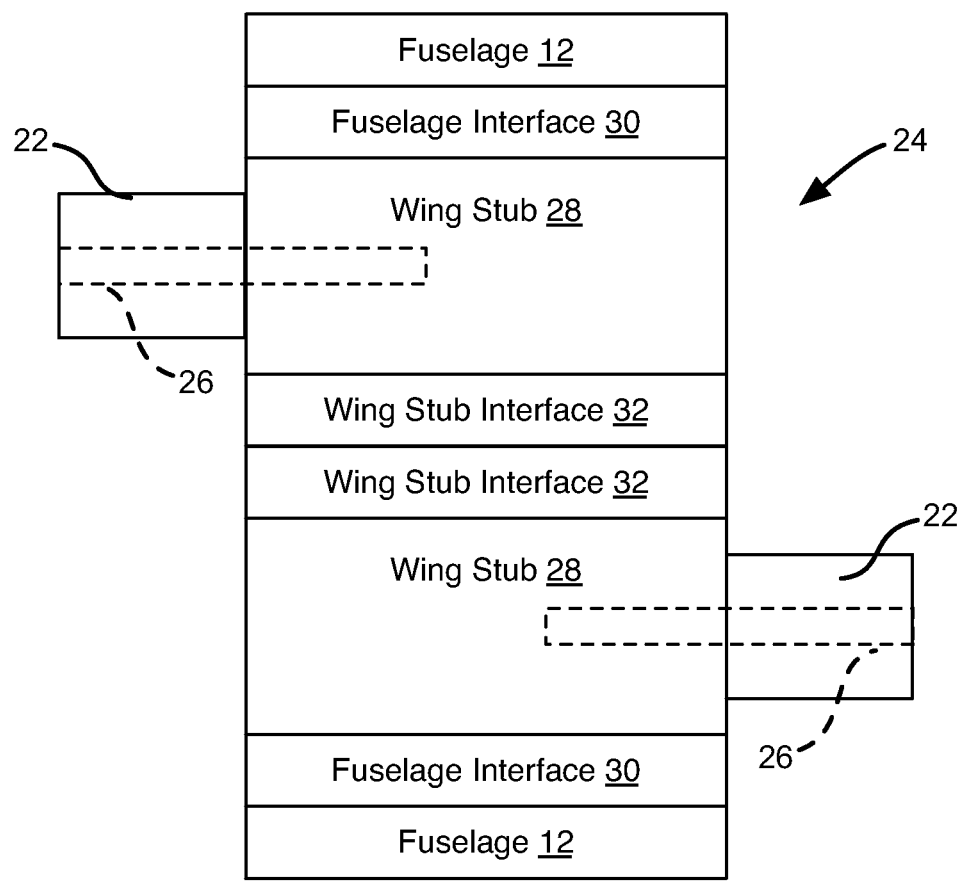
FIGS. 4A and 4B illustrate alternative embodiments of an indexing member attachment system in accordance with an embodiment of the present invention.

Referring to FIG. 4A, in one configuration, an attachment system may be as illustrated and include a wing stub 28 secured to another wing stub 28 by means of wing stub interfaces 32. Each wing stub 28 may also secure to the fuselage 12 by means of a fuselage interface 30. A wing 14 secured to the fuselage 12 may have an identical configuration with the wing stubs 28 replaced by the wing spars 20 of the wing 14. As shown in FIG. 4A, the indexing members 22 may be offset from one another in a longitudinal or vertical direction. In some embodiments, the fuselage interface 30 is embodied as an aperture through which the wing stubs are inserted and the securement of the wing stubs 28 to one another by means of the wing stub interface 32 may be primarily responsible for retaining the wing stubs 28 secured to the fuselage 12.

Figure 4B:
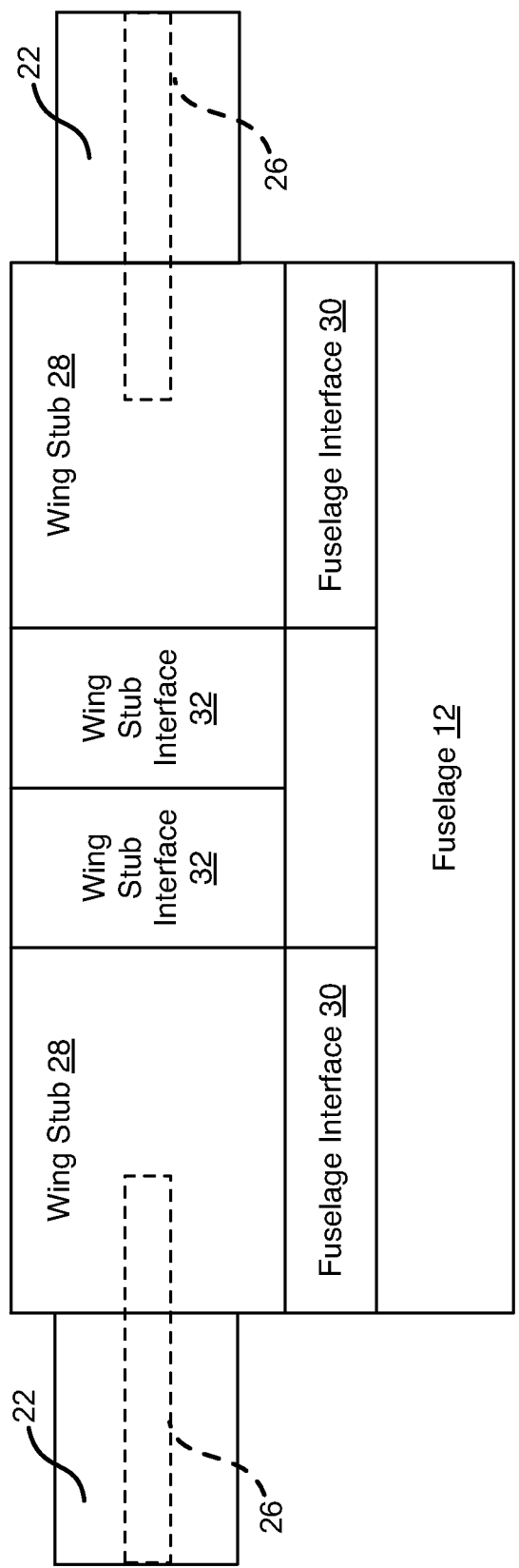

FIG. 4B illustrates an alternative configuration wherein the wing stubs 28 are aligned, e.g. aligned in one or both of the vertical and longitudinal directions. In such embodiments, the wing stubs 28 may secure separately to the fuselage 12 by means of fuselage interfaces 30. The wing stubs 28 may also secure to one another by means of wing stub interfaces 32.

Figure 5:
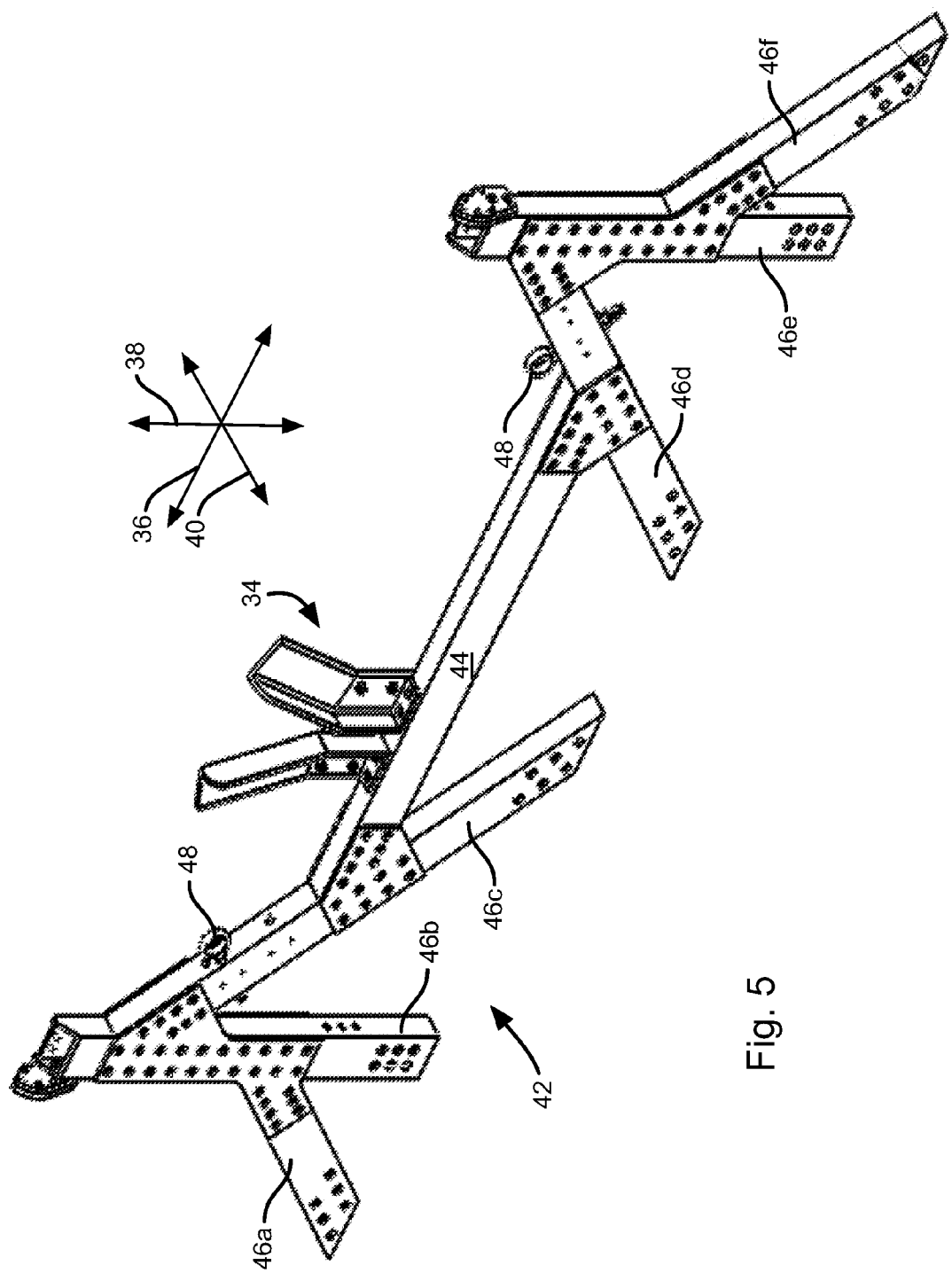
FIG. 5 is an isometric view of a receiver for an indexing member in accordance with an embodiment of the present invention.

Referring to FIG. 5, the indexing members 22 may be configured to seat within receivers 34 positioned on either side of the fuselage 12. A receiver 34 may be understood with respect to a longitudinal direction 36, a vertical direction perpendicular to the longitudinal direction 38, and a horizontal direction perpendicular to the directions 36, 38. The receiver 34 may permit lowering of the indexing member into the receiver 34 along the vertical direction. Once inserted within the receiver 34, the receiver 34 may prevent movement in at least one of the longitudinal direction 36 and the horizontal direction 40.

The receiver 34 may mount to a container or other storage facility by means of a frame 42. The frame 42 may have any configuration suitable for supporting the weight of the fuselage 12 as well as forces developed due to acceleration of the container. In the illustrated embodiment, the receiver 34 mounts to a cross member 44. The cross member 44 may also serve as a stop for an indexing member 22 inserted within the receiver 34 to prevent further vertically downward movement of the indexing member 22. Alternatively another member forming part of the receiver 34 performs the function of a stop.

Various other frame members 46a-46f may secure to the receiver 34 and/or cross member 44. One or more tie downs 48 may also secure to the receiver 34, cross member 44, and/or one or more of the frame members 46a-46f. The tie downs 48 may enable securement of the fuselage to the frame 42 when the indexing members 22 are positioned within the receivers 34.

Figure 6:
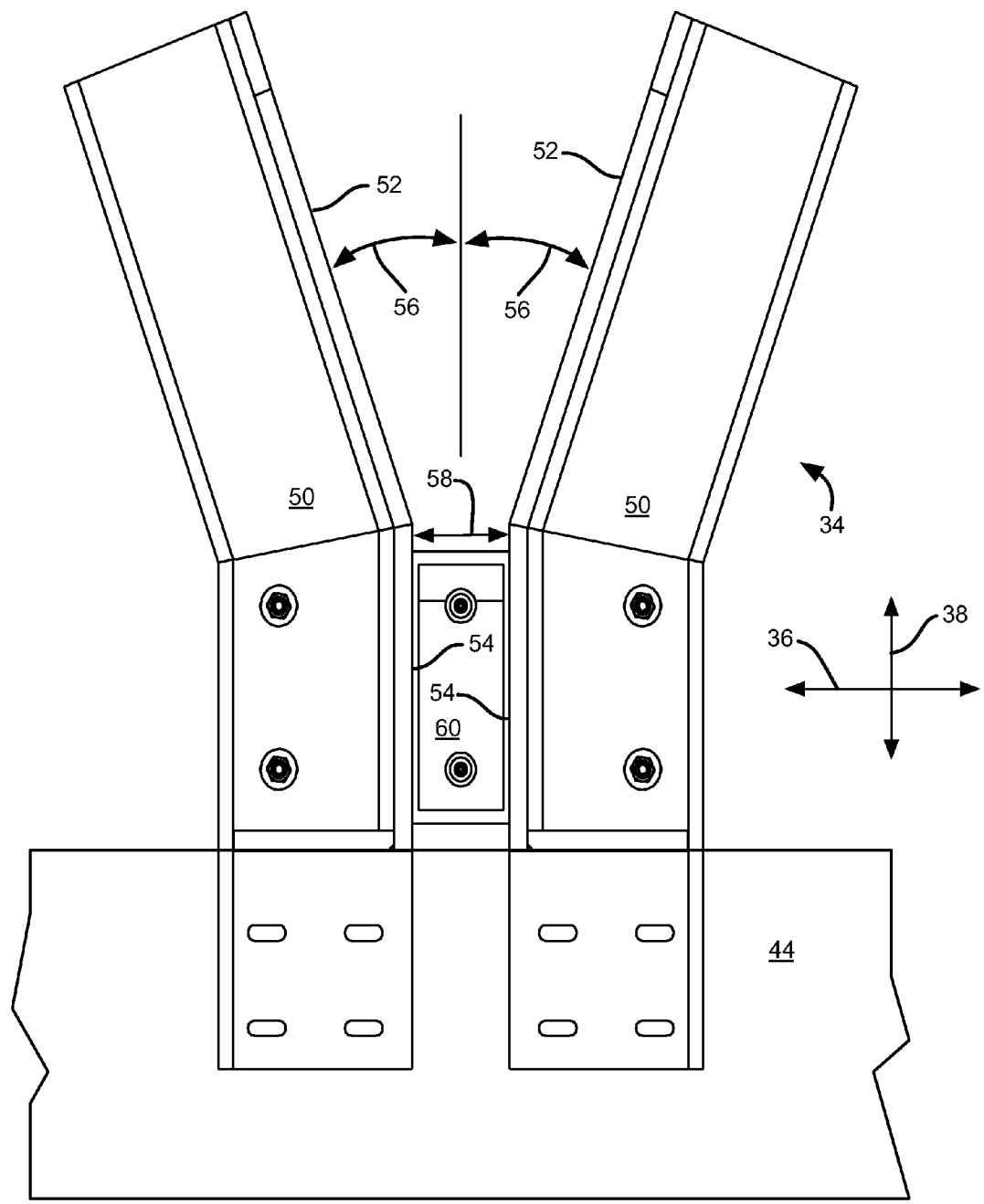
FIG. 6 is a side elevation view of a receiver for an indexing member in accordance with an embodiment of the present invention.

Referring to FIG. 6, a receiver 34 may be formed by one or more members 50 that define flared surfaces 52 and straight surfaces 54 in a plane parallel to the longitudinal direction 36 and vertical direction 38. The flared surfaces 52 define an angle 56 with respect to the vertical direction 38 such that the distance between the members 50 narrows with movement downward. The straight surfaces 54 may be separated by a distance 58. The distance 58 may be equal to or smaller than a width of the indexing member 22 such that deformation of the indexing member 22 may be required to position the indexing member 22 between the straight surfaces 54. Alternatively, the distance 58 may be slightly larger such that the indexing member 22 may be inserted between the straight surfaces 54 without effort. However, the distance 58 is preferably small enough such that excess movement of the indexing member 22 is not permitted. For example, the distance 58 may be between 1.001 and 1.01 times a width of the indexing member 22. In some embodiments, the flared surfaces 52 and straight surfaces 54 may be part of a continuous contour such that an upper portion having an angle 56 transitions gradually to a straight portion adjacent the beam 44 or other stopping surface. In some embodiments, the straight surfaces 54 may be slightly angled, e.g. within 5 degrees, preferably within 1 degree of parallel to the vertical direction 38. A back plate 60 may secure to the members 50 and prevent movement of the indexing member 22 outwardly from the receiver.

Figure 7A:
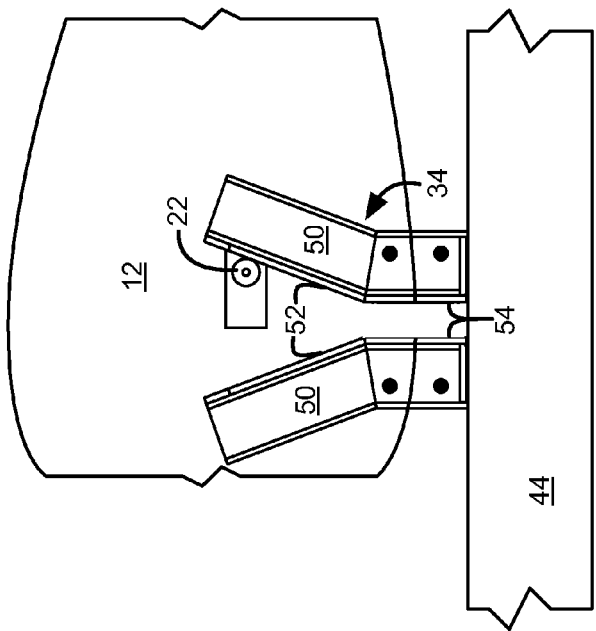
Figure 7B:
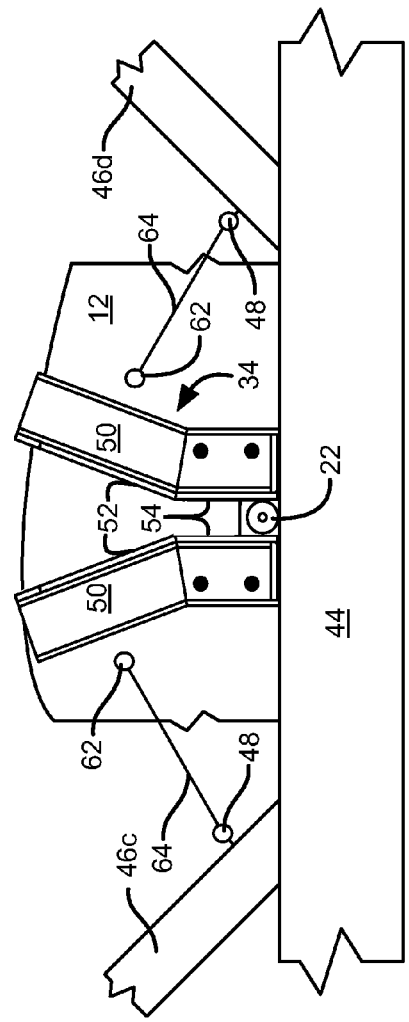

Referring to FIG. 7A, in use, the wing stubs 28 and indexing members 22 are secured to the fuselage 12 such that the indexing members 22 protrude horizontally outwardly from the fuselage 12. The fuselage 12 may then be lowered onto the receivers 34. In many instances, the indexing member 22 may be misaligned in the longitudinal direction from the gap between the straight surfaces 24. Accordingly, the indexing member 22 may first contact one of the flared surfaces 52. As the fuselage 12 is lowered, such as by a hoist or manually, the flared surfaces 52 guide the indexing members 22 into the gaps defined by the straight surfaces 24, as shown in FIG. 7B. The indexing member 22 is therefore constrained against longitudinal movement by the straight surfaces 54.

In some embodiments, the fuselage 12 may additionally be held in place by means of one or more tie down points 62 defined by or secured to the fuselage 12. For example, cables or other lines may secure to the tie down points 62 and the tie downs 48 thereby resisting removal of the indexing member 22 from the receiver 34 as well as resisting rotation of the fuselage 12.

Referring to FIG. 7C, in some embodiments, a clamp 66 may be used in combination with the receiver 34 in order to retain the indexing member 22 within the receiver 34. The clamp 66 may be any hold down clamp known in the art and may provide suitable clamping force to resist removal of the indexing member 22. In some embodiments, the clamp 66 may include an engagement member 68 that is pressed against the indexing member 22. The engagement member 68 may conform to a portion of the indexing member 22 or may simply be a planar surface or an elastic surface that deforms to partially conform to the indexing member 22. The clamp may be mounted to a member 50, beam 44, or any other portion of the frame 42. In still other embodiments, clamping of the indexing member 20 may be accomplished by bolting a block to the receiver 34, beam 44, a portion of the frame 42, or some other structure, in order to retain the indexing member 22 within the receiver 34 such that a surface of the block conforming to the indexing member 22 engages the indexing member 22.

Referring to FIGS. 8A-8C, the clamp 66 may have a closed position wherein the engagement member 68 is pivoted into engagement with the indexing member 22 positioned within the receiver. As known in the art, the hold down clamp 66 may have a handle 70 that may be used to pivot the engagement member 68 between a closed position (FIG. 8A) and an open position (8B). When in the open position, the engagement member 68 may be pivoted out of the channel defined by the receiver 34 such that the indexing member 22 may slide between the straight surfaces 54. In some embodiments, the clamp 66 may be used in combination with one or more tie down cables 64 as discussed above or any other additional support and retention means in order to resist rotation of the fuselage 12 or removal of the fuselage 12 from the receivers 34.

Figure 9:
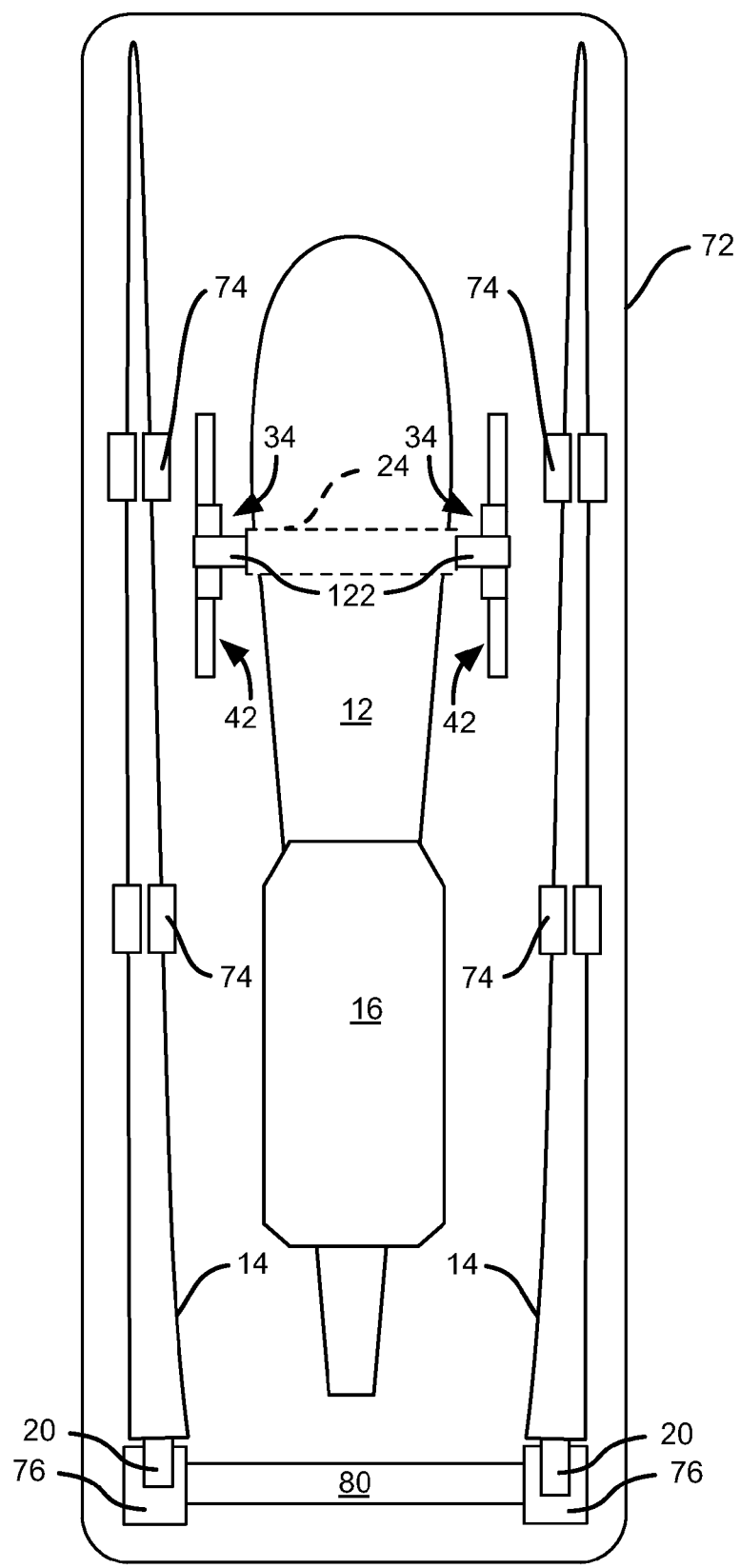
FIG. 9 is a top plan view of a disassembled UAV including a fuselage mounted to a container in accordance with an embodiment of the present invention.

Referring to FIG. 9, in some embodiments, the systems and methods disclosed herein may be used to secure the fuselage within a container 72. For example, a pair of frames 42 having receivers 34 mounted thereon may be secured within the container 72. The fuselage 12 may then be positioned within the container using the indexing members 22 to guide and restrain the fuselage 12 within the container 72 as described above. As also noted above, one or more additional tie downs or other restraints may also be used to prevent movement of the fuselage 12. The indexing members 22 may be helpful in that the fuselage may be registered and positioned within respect to one or more retaining members due to engagement of the indexing members 22 with the receivers 34.

In some embodiments, the container 72 may provide other structures for securing the wings 14 of the UAV 10 within the container. For example, a plurality of cradles 74 may secure the wings 14 within the container 72. The cradles 74 may be embodied as the cradles described in U.S. application Ser. No. 13/974,350, filed Aug. 23, 2013 and entitled RETENTION SYSTEM AND METHOD FOR A WING, which is hereby incorporated herein by reference in its entirety.

In some embodiments, the wing spar 20 of the wings 14 may be pinned with respect to the container using a wing spar retainer 76 as described in application Ser. No. 13/974,468, filed Aug. 23, 2013 and entitled RETENTION SYSTEM AND METHOD FOR A WING SPAR, which is hereby incorporated herein by reference in its entirety. The wing spar retainers 76 may be mounted to a common frame 80 secured to the container 72.

The container 72 may be a container as described in U.S. application Ser. No. 13/974,322 filed Aug. 23, 2013 and entitled CLOSURE SYSTEM FOR CONTAINERS, which is hereby incorporated herein by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for storing an aerial vehicle having a fuselage defining at least one attachment interface for receiving spars of wings secured to the fuselage, the system comprising:
    at least one indexing stub defining at least one mating interface configured to secure to the at least one attachment interface;
    a pair of indexing members secured to the indexing stub and protruding outside of opposite sides of the fuselage when the at least one mating interface is secured to the at least one attachment interface; and
    a pair of receivers mounted to a container and defining channels positioned to receive the indexing members, the channel of each receiver sized and positioned to receive one of the indexing stubs of the pair of indexing members and prevent longitudinal movement of the indexing stubs within the channel, the pair of receivers having structural strength effective to restrain the indexing stubs against longitudinal movement responsive to forces exerted on the fuselage when secured to the indexing members during shipping.

2. The system of claim 1, wherein the channels include an upper flared portion and a lower straight portion.

3. The system of claim 1, further comprising a pair of clamping members configured to selectively lock the indexing members within the channels.

4. The system of claim 1, wherein the pair of indexing members include cylindrical portions.

5. The system of claim 4, wherein the cylindrical portions are rotatable.

6. The system of claim 1, wherein the at least one indexing stub is a pair of indexing stubs, the indexing stubs defining stub interfaces for securing the indexing stubs to one another.

7. The system of claim 6, wherein the indexing members are offset from one another along a longitudinal direction.

8. The system of claim 1, wherein the at least one indexing stub is a pair of indexing stubs and the at least one mating interface is a pair of mating interfaces each defined by one of the indexing stubs.

9. A system for storing an aerial vehicle, the system comprising:
    a container;
    a fuselage of the aerial vehicle, the fuselage defining at least one attachment interface for receiving spars of wings secured to the fuselage;
    first and second indexing stubs each having an indexing member secured thereto, the first and second indexing stubs further defining a mating interface configured to secure to the at least one attachment interface, the indexing members of the first and second indexing stubs protruding outward from the fuselage when the mating interface is secured to the at least one attachment interface; and
    first and second receivers secured to the container and each defining a channel that is sized and positioned to receive one of the indexing members, the first indexing stub positioned within the channel of the first receiver and constrained against longitudinal movement by the channel of the first receiver, the second indexing stub positioned within the channel of the second receiver and constrained against longitudinal movement by the channel of the second receiver,
    wherein the first and second receivers have structural strength effective to resist forces exerted on the fuselage during shipping.

10. The system of claim 9, wherein the channels of the first and second receivers each include an upper flared portion and a lower straight portion, the indexing members being positioned in the lower straight portion during storage of the fuselage.

11. The system of claim 9, further comprising a pair of clamping members configured to selectively lock the indexing members within the channels.

12. The system of claim 9, wherein the indexing members each include a cylindrical portion.

13. The system of claim 12, wherein the cylindrical portions are rotatable.

14. A method for storing an aerial vehicle, the method comprising:
- removing wings from a fuselage of the aerial vehicle, the fuselage defining at least one attachment interface for receiving spars of the wings and the spars defining a first instance of at least one mating interface configured to secure to the attachment interface, removing the wings from the fuselage comprising disengaging the mating interface from the attachment interface;
- securing first and second indexing stubs to the fuselage, the first and second indexing stubs defining a second instance of the at least one mating interface, wherein securing the first and second indexing stubs to the fuselage includes securing the second instance of the at least one mating interface to the at least one attachment interface, the first and second indexing stubs further having first and second indexing members, respectively, secured thereto; and
- positioning the fuselage in a container having first and second receivers secured thereto such that the first and second indexing members are positioned within the first and second receivers, respectively, wherein the first and second receivers are mounted to a container and define channels positioned to receive the first and second indexing stubs, the channel of each receiver of the first and second receivers being sized and positioned to receive one of the first and second indexing stubs and prevent longitudinal movement of the one of the first and second indexing stubs within the channel, the first and second receivers having structural strength effective to restrain the first and second indexing stubs against longitudinal movement responsive to forces exerted on the fuselage when secured to the first and second indexing stubs during shipping.

15. The method of claim 14, wherein positioning the fuselage in the container further comprises=lowering the fuselage into the container such that the first and second indexing members engage flared portions of the first and second receivers and the flared portions of the first and second receivers guide the first and second indexing members into straight portions of the first and second receivers, respectively.

16. The method of claim 14, wherein:
- the first and second indexing members define a round perimeter and are rotatably mounted to the indexing stubs; and
- positioning the fuselage in the container further comprises:
  - lowering the fuselage into the container such that the first and second indexing members engage flared portions of the first and second receivers and roll along the flared portions into straight portions of the first and second receivers, respectively.

17. The method of claim 14, further comprising engaging first and second clamping devices with the first and second indexing members to retain the first and second indexing members within the first and second receivers, respectively.

18. The method of claim 14, further securing the first and second indexing stubs to one another.

19. The method of claim 14, further comprising detaching the first and second indexing stubs from the at least one attachment interface and reattaching the wing spars to the at least one attachment interface.

* * * * *